United States Patent
Kotzer et al.

(10) Patent No.: US 10,084,498 B2
(45) Date of Patent: Sep. 25, 2018

(54) CONFIGURABLE COMMUNICATIONS MODULE WITH REPLACEABLE NETWORK ACCESS DEVICE

(71) Applicant: GM GLOBAL TECHNOLOGY OPERATIONS LLC, Detroit, MI (US)

(72) Inventors: Igal Kotzer, Tel-Aviv (IL); Eilon Riess, Zikron-Yaakov (IL)

(73) Assignee: GM GLOBAL TECHNOLOGY OPERATIONS, LLC., Detroit, MI (US)

( * ) Notice: Subject to any disclaimer, the term of this patent is extended or adjusted under 35 U.S.C. 154(b) by 0 days.

(21) Appl. No.: 15/263,571

(22) Filed: Sep. 13, 2016

(65) Prior Publication Data

US 2017/0077976 A1    Mar. 16, 2017

Related U.S. Application Data

(60) Provisional application No. 62/219,331, filed on Sep. 16, 2015.

(51) Int. Cl.
  *H04B 1/3822* (2015.01)
  *H04B 1/3818* (2015.01)
  *B60R 11/00* (2006.01)
  *H04W 88/06* (2009.01)
  *B60R 11/02* (2006.01)

(52) U.S. Cl.
  CPC ......... *H04B 1/3822* (2013.01); *H04B 1/3818* (2015.01); *B60R 11/02* (2013.01); *B60R 2011/0042* (2013.01); *B60R 2011/0288* (2013.01); *H04W 88/06* (2013.01)

(58) Field of Classification Search
  CPC . B60R 11/02; B60R 11/0241; B60R 11/0252; B60R 11/0258; B60R 2011/0288; B60R 2011/0294; H04W 4/00; H04W 92/04; H04W 92/02; H04W 88/06; H04H 60/90; H04B 1/3818; H04B 1/3822
  USPC ......... 455/426.1, 426.2, 569.1, 569.2, 556.1, 455/557, 552.1
  See application file for complete search history.

(56) References Cited

U.S. PATENT DOCUMENTS

| | | | | |
|---|---|---|---|---|
| 5,610,941 A | * | 3/1997 | Tanaka ................. | H04B 1/3816 375/222 |
| 5,969,329 A | * | 10/1999 | Vallat .................. | G06K 7/0013 235/441 |
| 5,974,333 A | * | 10/1999 | Chen ................... | B60R 11/0241 455/346 |
| 6,002,605 A | * | 12/1999 | Iwasaki ................ | G06K 7/0021 235/380 |
| 6,663,007 B1 | * | 12/2003 | Sun ...................... | G06K 7/0043 235/441 |
| 7,603,139 B1 | * | 10/2009 | Tom .................... | H04M 1/0254 455/550.1 |

(Continued)

FOREIGN PATENT DOCUMENTS

WO    WO 2009/084746    *   7/2009    .............. H04B 1/40

*Primary Examiner* — Duc M Nguyen
(74) *Attorney, Agent, or Firm* — Reising Ethington, P.C.

(57) ABSTRACT

A system for providing telematics is provided that includes a communications unit having host circuitry coupled by an interface to at least one removable communications card, the interface includes a break line that enables disconnection of the at least one removable communications card from the host circuitry.

19 Claims, 2 Drawing Sheets

(56) References Cited

U.S. PATENT DOCUMENTS

| | | | | |
|---|---|---|---|---|
| 8,466,849 B2* | 6/2013 | Yoon | H01Q 1/244 | 343/876 |
| 8,774,187 B2* | 7/2014 | Hartman | H04L 49/351 | 370/392 |
| 2001/0001319 A1* | 5/2001 | Beckert | B60R 11/02 | 701/36 |
| 2002/0137541 A1* | 9/2002 | Lepley | H04B 1/3838 | 455/556.1 |
| 2003/0220022 A1* | 11/2003 | Kawaguchi | G06K 7/0021 | 439/633 |
| 2004/0065741 A1* | 4/2004 | Reddersen | G06F 1/18 | 235/462.45 |
| 2005/0020223 A1* | 1/2005 | Ellis | H04B 1/20 | 455/186.1 |
| 2005/0153749 A1* | 7/2005 | Falcon | B60R 11/0241 | 455/569.1 |
| 2007/0140187 A1* | 6/2007 | Rokusek | H04L 67/16 | 370/338 |
| 2007/0283073 A1* | 12/2007 | Doak | G06F 13/387 | 710/305 |
| 2008/0300008 A1* | 12/2008 | Kim | H04B 1/3816 | 455/552.1 |
| 2008/0318478 A1* | 12/2008 | Nelson | H05K 1/117 | 439/620.01 |
| 2010/0227631 A1* | 9/2010 | Bolton | H04L 51/24 | 455/466 |
| 2011/0235587 A1* | 9/2011 | Zhang | H04M 1/72519 | 370/328 |
| 2012/0052807 A1* | 3/2012 | Rathi | H04W 76/025 | 455/41.3 |
| 2012/0309289 A1* | 12/2012 | Walsh | H04M 1/7253 | 455/3.06 |
| 2013/0111521 A1* | 5/2013 | Klarke | H04N 21/4221 | 725/38 |
| 2014/0302888 A1* | 10/2014 | Syal | H04M 1/0256 | 455/552.1 |
| 2014/0329467 A1* | 11/2014 | Ewing | H04W 8/005 | 455/41.2 |
| 2015/0065065 A1* | 3/2015 | Rofougaran | H04B 1/52 | 455/78 |
| 2015/0189218 A1* | 7/2015 | Kim | H04N 5/602 | 348/792 |
| 2016/0124887 A1* | 5/2016 | Douglas | G06F 13/4081 | 710/301 |
| 2016/0191704 A1* | 6/2016 | Macinnes | H04Q 9/00 | 455/411 |

* cited by examiner

CONFIGURABLE COMMUNICATIONS MODULE WITH REPLACEABLE NETWORK ACCESS DEVICE

CROSS REFERENCE TO RELATED APPLICATION

This application claims the benefit of U.S. Provisional Application No. 62/219,331, filed on Sep. 16, 2015, the entire contents of which are hereby incorporated by reference.

TECHNICAL FIELD

The present invention relates to vehicle communications, and in particular, to enhancing vehicle communication capabilities by providing a configurable communications module having a replaceable network access device.

BACKGROUND

Telematics units are now widely in use on vehicles to provide drivers and passengers with various types of wireless assistance services. For example, roadside assistance, which historically involved a disabled vehicle and a physical visit to the vehicle by a serviceman, can now in many instances be provided remotely via wireless telecommunication with the vehicle through existing cellular network facilities. Thus, a telephone call to a call center can be used to electronically unlock doors where the keys have inadvertently been locked inside. Also, navigation and emergency assistance services can be obtained by voice communication with an advisor at the call center. Monitoring of vehicle operating conditions by the call center is also possible via the telematics unit. For example, an air bag deployment event can be automatically reported to the call center where it triggers a return call to the vehicle from a live advisor to determine if emergency services are needed. However, the services and capabilities of the telematics unit are characteristically limited to the technology and capabilities that exist at the time of design. Aside from software updates that address functionality and limited hardware adjustments, the traditional telematics unit is not upgradeable with respect to the network access device that enables the wireless assistance services. Consequently, the telematics unit becomes outdated and incompatible with emerging wireless and cellular technologies.

SUMMARY

According to an embodiment of the invention, there is provided a system for providing telematics that includes a communications unit having host circuitry coupled by an interface to at least one removable communications card, the interface includes a break line that enables disconnection of the at least one removable communications card from the host circuitry.

According to another embodiment of the invention, there is provided a communications device that includes a host communications board coupled to a first network access device, wherein the host communications board is configured to communicatively detach from the network access device and communicatively couple to a second network access device.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below pertain to a configurable communications module (CCM) having a host communications board with a replaceable network access device. In one embodiment, the host communications board and an original network access device are connected by a printed circuit board (PCB) interface having a predetermined or intentional break line. The interface is configured to disconnect at the break line enabling removal of the original network access device. The portion of the interface remaining on the host serves as a male connector for a replacement network access device having a mating female connector.

In another embodiment, instead of breaking off the original network access device, another insertion slot is added to the CCM such that a replacement network access device may be inserted. At the end of the insertion slot is a board with electrical traces configured to receive a connector of the same type used for personal computers. (i.e., similar to the female connector in the first embodiment). In this way, once the replacement network access device connects to the host (via the host communications board), the original network access device that is part of the host board is disabled.

In yet another embodiment, a secondary insertion slot is added adjacent to the original network access device slot. The secondary insertion slot is configured to receive a replaceable network access device that disables the original network access device. In this configuration the replaceable network access device is equipped with one or more spring connectors at the end, such that when inserted into the secondary slot, the spring connectors make contact with electrical traces on the host board that disable the original network access device.

Communications System

The following detailed description is merely exemplary in nature and is not intended to limit the application and uses. Furthermore, there is no intention to be bound by any expressed or implied theory presented in the preceding technical field, background, brief summary or the following detailed description.

Referring to the Figures, wherein like numerals indicate like parts throughout the several views, there is shown an operating environment that comprises a mobile vehicle communications system 10 and that can be used to implement the method disclosed herein. While the approach and methodology described below relate to vehicle communications, one of ordinary skill in the art appreciates that an automotive application is merely exemplary, and that the concepts disclosed herein may also be applied to any other suitable communications system, but more specifically, non-vehicle applications. The term vehicle as described herein is also to be construed broadly to include not only a passenger car, but any other vehicle including, but not limited to, motorcycles, trucks, sports utility vehicles (SUVs), recreational vehicles (RVs), marine vessels, and aircraft.

Figure 1:
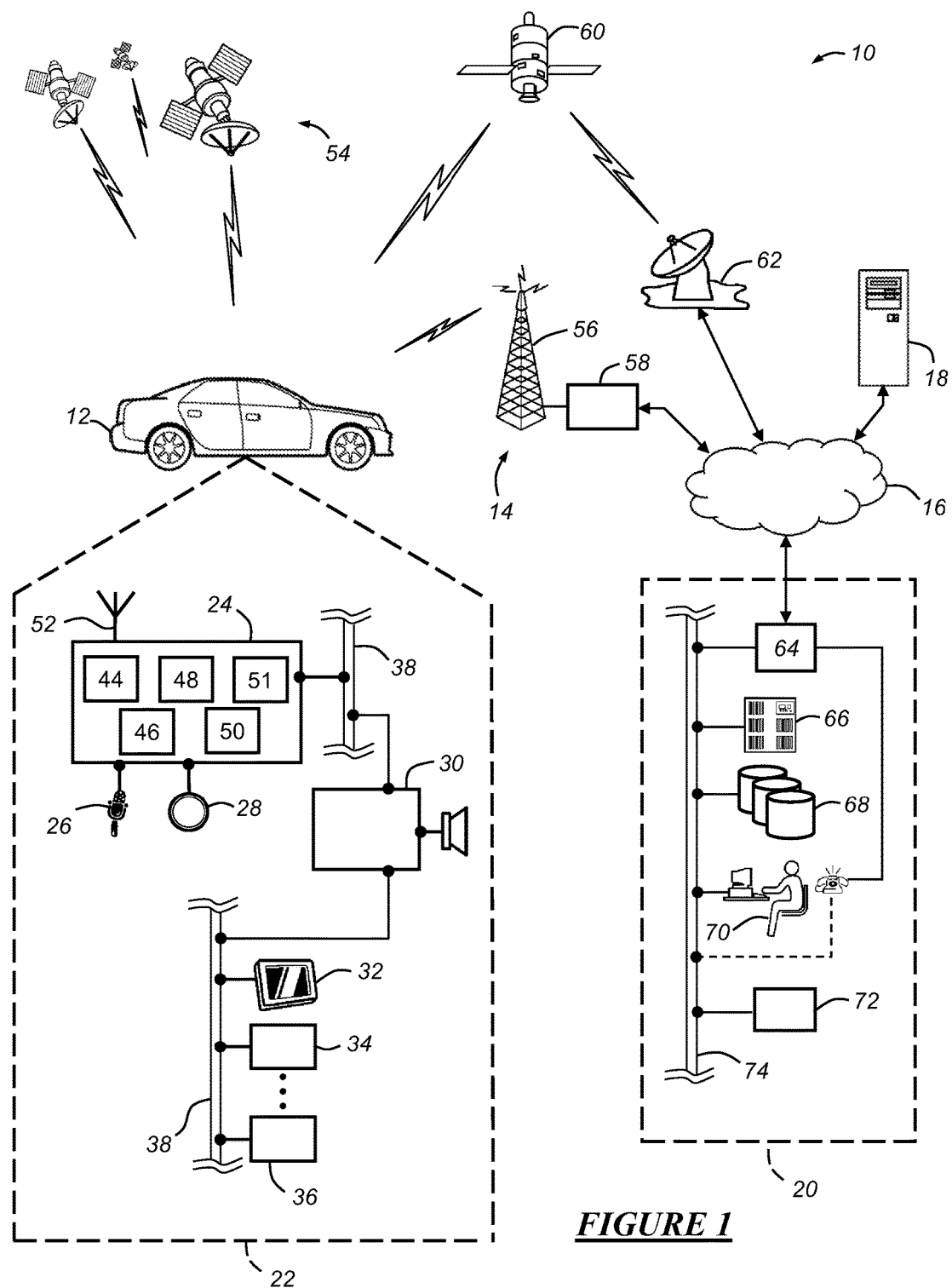
FIG. 1 is a block diagram depicting an embodiment of a communications system that is capable of utilizing the system and method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 includes vehicle hardware 22 having a configurable communications module (CCM) 24, a microphone 26, one or more pushbuttons or other control inputs 28, an audio system 30, and a visual display 32, a GPS module 34, as well as a number of vehicle system modules (VSMs) 36. Some of these devices can be connected directly to the CCM 24 such as, for example, the microphone 26 and pushbutton(s) 28, whereas others are indirectly connected using one or more network connections, such as a vehicle communications bus or an entertainment bus 38. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

CCM 24 is itself a vehicle system module (VSM) and can be an OEM-installed (embedded) or aftermarket device that is installed in the vehicle. In one embodiment, CCM 24 is a telematics device that enables a variety of telematics including wireless voice and/or data communication over wireless carrier system 14 and via wireless networking. Telematics, as used herein, refers broadly to a range of telecommunications and information processing. As such, telematics may encompass technologies relating to, for example, telecommunications, vehicular technologies, road transportation, road safety, sensors, instrumentation, wireless communications, multimedia, Internet, to name a few. In the vehicular embodiment shown in FIG. 1, CCM 24 enables the vehicle to communicate with call center 20, other telematics-enabled vehicles, or some other entity or device. CCM 24 preferably uses radio transmissions to establish a communications channel (a voice channel and/or a data channel) with wireless carrier system 14 so that voice and/or data transmissions can be sent and received over the channel. By providing both voice and data communication, CCM 24 enables the vehicle to offer a number of different services including those related to navigation, telephony, emergency assistance, diagnostics, infotainment, etc. For example, an infotainment module may provide for managing and playing audio content, utilizing navigation for driving, delivering rear-seat entertainment such as movies, games, social networking, listening to incoming and sending outgoing SMS text messages, making phone calls, and accessing Internet-enabled or smartphone-enabled content such as traffic conditions, sports scores, and weather forecasts. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, CCM 24 utilizes cellular communication according to GSM, CDMA, or LTE standards, etc. and thus includes a standard cellular chipset 44 for voice communications like hands-free calling, a wireless modem 46 for data transmission, an electronic processing device or processor 48, one or more digital memory devices 50 including volatile and non-volatile memory, and a dual antenna 52. It should be appreciated that the modem 46 can either be implemented through software that is stored in the CCM 24 and is executed by processor 38, or it can be a separate hardware component located internal or external to CCM 24. In addition, modem 46 may be embodied as a network access device, which may include one, or a combination of, a modem, router, and/or power supply. Furthermore, one or more of the cellular chipset 44, wireless modem 46, processor 48, and memory devices 50 may be collectively embodied in the form of software and/or hardware in a device that is physically separable from a main or host portion of the CCM 24. The modem can operate using any number of different standards or protocols such as LTE, EVDO, CDMA, GPRS, and EDGE. Wireless networking between the vehicle and other networked devices can also be carried out using CCM 24. For this purpose, CCM 24 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

The processing device 48 in CCM 24 can be any type of device capable of processing electronic instructions including microprocessors, microcontrollers, host processors, controllers, vehicle communication processors, and application specific integrated circuits (ASICs). It can be a dedicated processor used only for CCM 24 or can be shared with other vehicle systems. The processing device executes various types of digitally-stored instructions, such as software or firmware programs stored in the memory, which enable the CCM 24 to provide a wide variety of services. For instance, the processing device can execute programs or process data to carry out at least a part of the method discussed herein.

CCM 24 can be used to provide a diverse range of vehicle services that involve wireless communication to and/or from the vehicle. Such services include: turn-by-turn directions and other navigation-related services that are provided in conjunction with the GPS-based vehicle navigation module 34; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of CCM 24, but are simply an enumeration of some of the services that the CCM 24 is capable of offering. Furthermore, it should be understood that at least some of the aforementioned modules could be implemented in the form of software instructions saved internal or external to CCM 24, they could be hardware components located internal or external to CCM 24, or they could be integrated and/or shared with each other or with other systems located throughout the vehicle, to cite but a few possibilities. In the event that the modules are implemented as VSMs 36 located external to CCM 24, they could utilize vehicle bus 38 to exchange data and commands with the telematics unit.

GPS module 34 receives radio signals from a constellation 54 of GPS satellites. From these signals, the module 34 can determine vehicle position that is used for providing navigation and other position-related services to the vehicle driver. Navigation information can be presented on the display 32 (or other display within the vehicle) or can be presented verbally such as is done when supplying turn-by-turn navigation. The navigation services can be provided using a dedicated in-vehicle navigation module (which can be part of GPS module 34), or some or all navigation services can be done via CCM 24, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 34 from the call center 20 via the CCM 24.

Apart from the audio system 30 and GPS module 34, the vehicle 12 can include other vehicle system modules (VSMs) 36 in the form of electronic hardware components that are located throughout the vehicle and typically receive input from one or more sensors and use the sensed input to perform diagnostic, monitoring, control, reporting and/or other functions. Each of the VSMs 36 is preferably connected by communications bus 38 to the other VSMs, as well as to the CCM 24, and can be programmed to run vehicle system and subsystem diagnostic tests. As examples, one VSM 36 can be an engine control module (ECM) that controls various aspects of engine operation such as fuel ignition and ignition timing, another VSM 36 can be a powertrain control module that regulates operation of one or more components of the vehicle powertrain, and another VSM 36 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

In some embodiments, the VSMs may include a processor and memory (not shown). The processor can be any type of device capable of processing electronic instructions including microprocessors, microcontrollers, host processors, controllers, vehicle communication processors, and application specific integrated circuits (ASICs). The processor may execute various types of digitally-stored instructions, such as software or firmware programs stored in the memory, which enable the processor to execute programs or process data to carry out at least a part of the method discussed herein. The memory may include non-transitory computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes.

Vehicle electronics 22 also includes a number of vehicle user interfaces that provide vehicle occupants with a means of providing and/or receiving information, including microphone 26, pushbuttons(s) 28, audio system 30, and visual display 32. As used herein, the term 'vehicle user interface' broadly includes any suitable form of electronic device, including both hardware and software components, which is located on the vehicle and enables a vehicle user to communicate with or through a component of the vehicle. Microphone 26 provides audio input to the CCM 24 to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 28 allow manual user input into the CCM 24 to initiate wireless telephone calls and provide other data, response, or control input. Separate pushbuttons can be used for initiating emergency calls versus regular service assistance calls to the call center 20. Audio system 30 provides audio output to a vehicle occupant and can be a dedicated, stand-alone system or part of the primary vehicle audio system. According to the particular embodiment shown here, audio system 36 is operatively coupled to both vehicle bus 38 and/or an entertainment bus and can provide AM, FM and satellite radio, CD, DVD and other multimedia functionality. This functionality can be provided in conjunction with or independent of the infotainment module described above. Visual display 32 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 56 (only one shown), one or more mobile switching centers (MSCs) 58, as well as any other networking components required to connect wireless carrier system 14 with land network 16. Each cell tower 56 includes sending and receiving antennas and a base station, with the base stations from different cell towers being connected to the MSC 58 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 60 and an uplink transmitting station 62. Uni-directional communication can be, for example, satellite radio services, wherein programming content (news, music, etc.) is received by transmitting station 62, packaged for upload, and then sent to the satellite 60, which broadcasts the programming to subscribers. Bi-directional communication can be, for example, satellite telephony services using satellite 60 to relay telephone communications between the vehicle 12 and station 62. If used, this satellite telephony can be utilized either in addition to or in lieu of wireless carrier system 14.

Communications network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14. The Internet infrastructure in network 16 is a global infrastructure of interconnected computer networks to link billions of devices worldwide. The Internet is an international network of networks that consists of millions of private, public, academic, business, and government packet switched networks linked by a broad array of electronic, wireless, and optical networking technologies. These computer networks are accessible through the vehicle 12 via CCM 24 and wireless carrier system 14 and include, but are not limited to, all servers that host websites, proprietary servers, and DNS servers.

Computer 18 can be one of a number of computers accessible via a private or public network such as the Internet. Each such computer 18 can be used for one or more purposes, such as a web server accessible by the vehicle via CCM 24 and wireless carrier 14. Other such accessible computers 18 can be, for example: a service center computer where diagnostic information and other vehicle data can be uploaded from the vehicle via the CCM 24; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 64, servers 66, databases 68, live advisors 70, as well as an automated voice response system (VRS) 72, all of which are known in the art. These various call center components are preferably coupled to one another via a wired or wireless local area network 74. Switch 64, which can be a private branch exchange (PBX) switch, routes incoming signals so that voice transmissions are usually sent to either the live adviser 70 by regular phone or to the automated voice response system 72 using VoIP. The live advisor phone can also use VoIP as indicated by the broken line in FIG. 1. VoIP and other data communication through the switch 64 is implemented via a modem (not shown) connected between the switch 64 and network 74. Data transmissions are passed via the modem to server 66 and/or database 68. Database 68 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 70, it will be appreciated that the call center can instead utilize VRS 72 as an automated advisor or, a combination of VRS 72 and the live advisor 70 can be used.

Figure 2A:
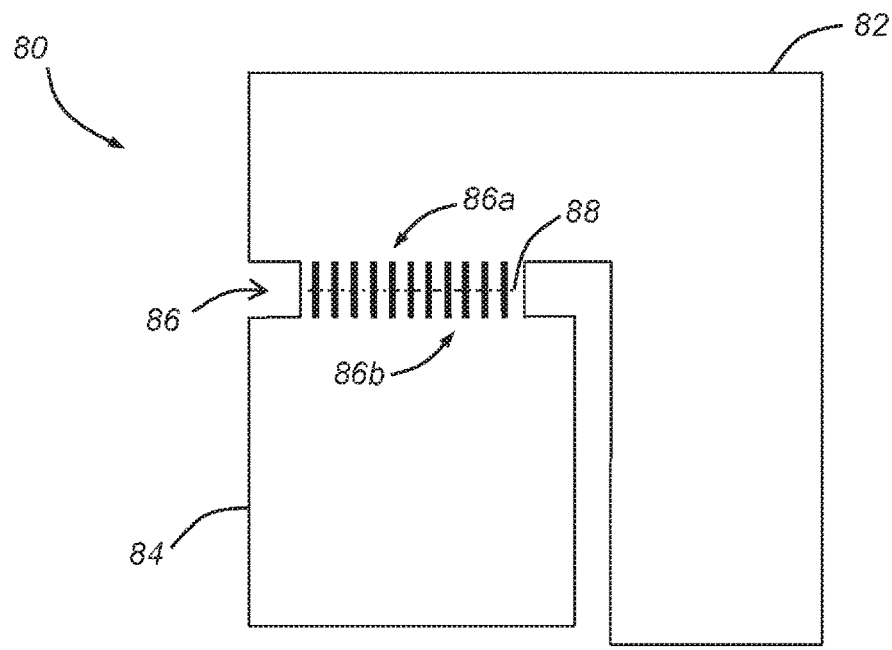
FIGS. 2A and 2B illustrate an exemplary embodiment of a configurable communications module according to one embodiment of the present invention.
Figure 2B:
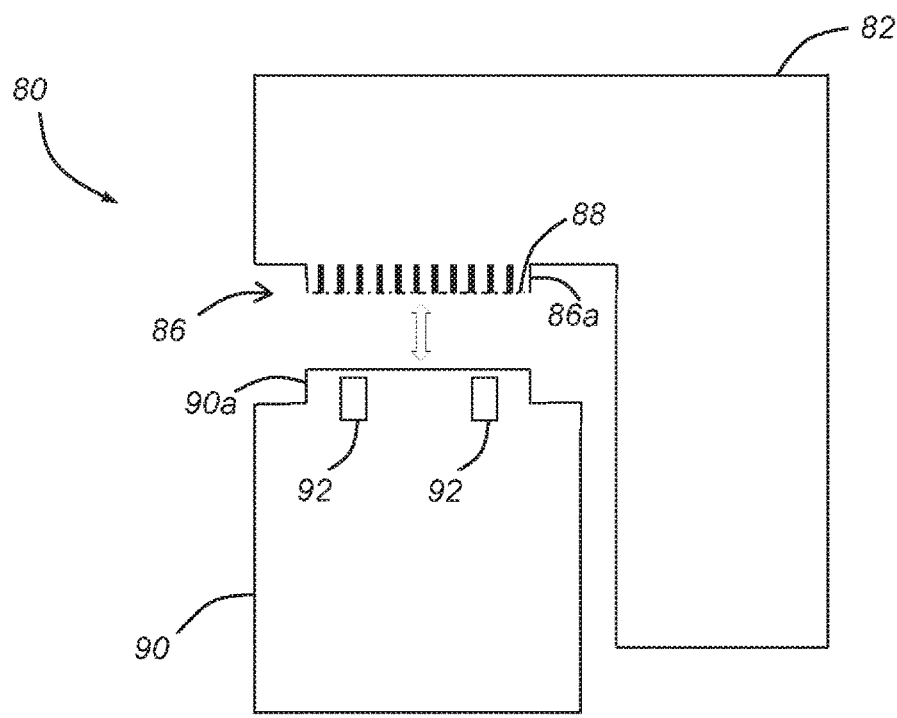

Referring to FIGS. 2A and 2B, an exemplary embodiment of CCM 24 includes circuitry 80 having host communications circuitry 82 coupled to a removable network access device 84. In one embodiment, the host communications circuitry 82 is implemented on a printed circuit board and includes at least one, or a combination, of the cellular chipset 44, processor 48, and/or memory devices 50. Referring to FIG. 2A, the circuitry 80 includes an interface 86 physically and communicatively coupling the host communications circuitry 82 to the removable network access device 84. In one embodiment, the interface 86 is a printed circuit board having electrical traces that galvanically connect the host communications board 80 to the removable network access device 84. In this way, the circuitry 80 is implemented on a unitary circuit board allowing a direct connection between the host communications board 80 and the removable network access device 84 without the use of connectors.

The interface 86 includes a predefined break line 88 for physically and communicatively disconnecting the removable network access device 84 from the host communications board 80. More particularly, the interface 86 is configured to physically disconnect at the break line 88 to enable removal and replacement of the network access device 84. One of ordinary skill in the art appreciates that break line 88 may be achieved in any suitable manner including, but not limited to, perforations, scoring, and/or grooves. In one embodiment, the break line 88 divides the interface 86 into two portions; one portion 86a extending from the host communications circuitry 82 and one portion 86b extending from the network access device 84. The break line 88 is disposed along an intersection of the first and second portions of the interface 86.

With reference to FIG. 2B, when the network access device 84 is separated from the host communications circuitry 82 at the break line 88, portion 86a of the interface 86 remains on the host communications board 80 and serves as a male connector for a replacement network access device 90 having a mating female connector 90a. In this way, the interface 86 between the host hardware and the network access device enables plug-and-play functionality.

In another embodiment, instead of separating the removable network access device 84 using the break line 88 on the interface 86, the replacement network access device 90 may be coupled to the host communications circuitry 82 by inserting the replacement network access device 90 into an auxiliary slot 51 on the CCM 24. Auxiliary slot 51 may include an interface with contacts, such as pins, configured to interface with complementary contacts on the network access device 90. The interface in the slot is configured to have a mating arrangement with an interface on the replacement network access device. The contacts in the auxiliary slot 51 couple to various circuits in CCM 24 to enable plug-and-play functionality of the network access device 90. In one embodiment, the contacts in the auxiliary slot 51 include electrical traces configured to receive a connector of the same type used for personal computers. (i.e., similar to the female connector in the first embodiment in FIG. 2B). In this way, once the replacement network access device 90 connects to the host (via the host communications board 80), the original network access device 84 that is part of the host board 80 is disabled. Software running on the CCM 24, and in particular processor 48, may be configured to disable the original network access device 84 upon detection of the replacement network access device 90 in the auxiliary slot 51

In yet another embodiment, the auxiliary slot 51 may be located adjacent to the original network access device 84 in CCM 24. Like the previous embodiment, the auxiliary slot 51 may be configured to receive the replaceable network access device 90 that disables the original network access device 84. However, in this configuration the replaceable network access device 90 may be equipped with one or more spring connectors (e.g., finger contacts) 92 at the end of the network access device 90 such that when inserted into the auxiliary slot 51, the spring connectors 92 make contact or engage with electrical traces on the host communications board 80 that disable the original network access device 84.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A system for providing wireless communications and telematics, comprising:
    a communications unit having circuitry configured to provide wireless communications using a cellular communications protocol, a short-range wireless communications protocol, or both, the circuitry is implemented on a unitary printed circuit board having a host circuitry portion coupled by an interface portion to a network access device portion, the interface portion includes a break line that enables the network access device portion of the unitary printed circuit board to be disconnected from the host circuitry portion of the unitary printed circuit board, and the interface portion directly connects the host circuitry portion and the network access device portion without use of connectors, wherein the break line includes perforations, scoring, grooves, or a combination thereof that are disposed along the unitary printed circuit board in order to facilitate disconnection of the network access device portion from the host circuitry portion.

2. The system of claim 1, wherein the interface portion includes a first portion extending from the host circuitry portion and a second portion extending from the network access device portion, and wherein the break line is disposed along an intersection of the first and second portion of the interface.

3. The system of claim 2, wherein the first portion of the interface forms a male connector when separated from the second portion at the break line.

4. The system of claim 3, wherein the male connector of the first portion of the interface is configured to receive a female connector of a network access device.

5. The system of claim 4, wherein network access device portion and the network access device are modems.

6. The system of claim 1, wherein the network access device portion is detachable from the host circuitry along the break line of the interface portion.

7. The system of claim 1, wherein the interface portion physically and communicatively couples the host circuitry portion to the network access device portion.

8. The system of claim 1, wherein the interface portion is configured to sever the connection between the host circuitry portion and the network access device portion at the break line of the interface.

9. The system of claim 1, wherein the host circuitry portion and the network access device portion are physically and communicatively disconnected from one another when the network access device portion is detached from the host circuitry portion at the break line.

10. A communications device configured to provide wireless communications, comprising:
    a host communications board physically and communicatively coupled to a first network access device, the host communications board configured to provide cellular communications and the first network access device configured to provide short-range wireless communications, wherein the host communications board and the first network access device are implemented on a unitary printed circuit board allowing a direct connection between the host communications board and the first network access device without use of connectors; and
    a slot configured to receive an upgraded network access device, wherein upon detection of the upgraded network access device within the slot, the host communications board is configured to automatically communicatively detach from the first network access device and communicatively couple to the upgraded network access device.

11. The communications device of claim 10, wherein the unitary printed circuit board includes an interface that enables physical and communicative detachment of the first network access device from the host communications board.

12. The communications device of claim 10, wherein the interface includes a first portion extending from the host communications board and a second portion extending from the first network access device, and wherein the interface includes a break line disposed along an intersection of the first and second portion.

13. The communications device of claim 12, wherein the host communications board and the first network access device are physically and communicatively disconnected from one another when the first network access device is detached from the host communications board at the break line.

14. The communications device of claim 12, wherein the break line in the interface is formed by one of, or a combination of, perforations, scoring, and grooves.

15. The communications device of claim 12, wherein the first portion of the interface is male connector configured to receive a female portion of the upgraded network access device.

16. The communications device of claim 10, wherein the host communications board is configured to detect and communicatively couple to the upgraded network access device through an interface in the slot, which has a mating arrangement with an interface on the upgraded network access device.

17. The communications device of claim 10, wherein the host communications board is configured to engage with a spring connector attached to the upgraded network access device.

18. The communications device of claim 17, wherein the host communications board is configured to disable the connection to the first network access device when the spring connector of the upgraded network access device engages with contacts on the host communications board.

19. The communications device of claim 10, wherein the first and upgraded network access devices are modems.

* * * * *